Aug. 8, 1944.    W. P. LEAR    2,355,381
PRESELECTION CONTROL MECHANISM
Filed Feb. 25, 1942    5 Sheets-Sheet 1

INVENTOR
William P. Lear
BY Richard A. Maran
his ATTORNEY

Aug. 8, 1944.  W. P. LEAR  2,355,381
PRESELECTION CONTROL MECHANISM
Filed Feb. 25, 1942  5 Sheets-Sheet 2

INVENTOR
William P. Lear
BY Richard A. Marson
his ATTORNEY

Aug. 8, 1944.                    W. P. LEAR                    2,355,381
                        PRESELECTION CONTROL MECHANISM
                    Filed Feb. 25, 1942          5 Sheets-Sheet 5

INVENTOR
William P. Lear
BY Richard A. Marsen
his ATTORNEY

Patented Aug. 8, 1944

2,355,381

UNITED STATES PATENT OFFICE 2,355,381

PRESELECTION CONTROL MECHANISM

William P. Lear, Piqua, Ohio, assignor, by mesne assignments, to Lear Avia, Inc., Piqua, Ohio, a corporation of Illinois Application February 25, 1942, Serial No. 432,195

18 Claims. (Cl. 33—136)

This invention relates to remote control systems particularly useful aboard an aircraft for controllably extending and retracting a trailing wire antenna.

Most modern aircraft, particularly the heavier and long range types, utilize a trailing wire antenna for efficient transmission and reception of radio signals. It is well known that different radio frequencies require corresponding lengths of antenna for the most effective utilization of the available radio energy. A projecting wire one-quarter wave length long provides the most practical antenna for radio transmission from the aircraft. Thus, where a number of wave lengths are utilized it is desirable to correspondingly automatically remotely control or adjust the length of the extended antenna wire. Additionally, such aircraft are usually provided with numerous accessories which are mechanically operated to predetermined positions. It is desirable to remotely control the desired operated positions of these accessories from a point adjacent the pilot.

My present invention is directed to a preselection control device operable to effect automatic remote control of a movable element, such as an aircraft accessory, to readily position the accessory in any desired position. With the present invention, the pilot simply sets the pointer of the control device to indicate the desired position of the accessory, and the control device automatically controls the actuator for the accessory to obtain the desired position. Such control is effective to position the accessory into a predetermined relation with any selected starting position. My present invention may be used, for instance to effect automatic remote control of a reelable antenna wire, to readily project any desired antenna length from the aircraft. With the present invention, the pilot simply sets the pointer of the control unit opposite the desired antenna length reading, and the mechanism automatically controls the reel to effect the desired antenna length, even if it should require extension or retraction of already extended wire. The present invention is in the nature of an improvement on my basic remote control system disclosed in my patent No. 2,249,926 entitled "Remote control mechanism" which issued on July 22, 1941.

When used to control the reelable antenna wire, an important feature of my present invention resides in its effectively controlling the length of the antenna directly from any one position to any other, regardless of whether the latter length is greater or shorter than the former. For example, should 85 feet of antenna wire be extended and the pilot require only 48 feet for a new wave length, he simply resets the control pointer from the 85 to the 48 foot mark, and the antenna is correspondingly automatically reset. In setting the control pointer to any desired position in the present system, the pilot is assured that the corresponding antenna amount is automatically projected from the aircraft. It is unnecessary for him, for example, to first fully retract the antenna before setting up for the extension of the new required length. He need only refer to the control knob and associated pointer. Whichever position the pointer is set results in a corresponding direct motivation and control of the antenna reel and wire. The system also provides other features and advantages, including automatic safety limit circuits to prevent undue extension or retraction of the antenna reel.

The above advantages, features and capabilities of the present invention will become more apparent from the following description of a preferred embodiment thereof, illustrated in the drawings, in which.

While the preselection control device of the present invention may be used in any desired application for remotely preselecting the desired operated position of a member, it will, for purposes of illustration, be particularly described as applied to control the extended position of a reelable antenna wire.

Figures 1, 2:
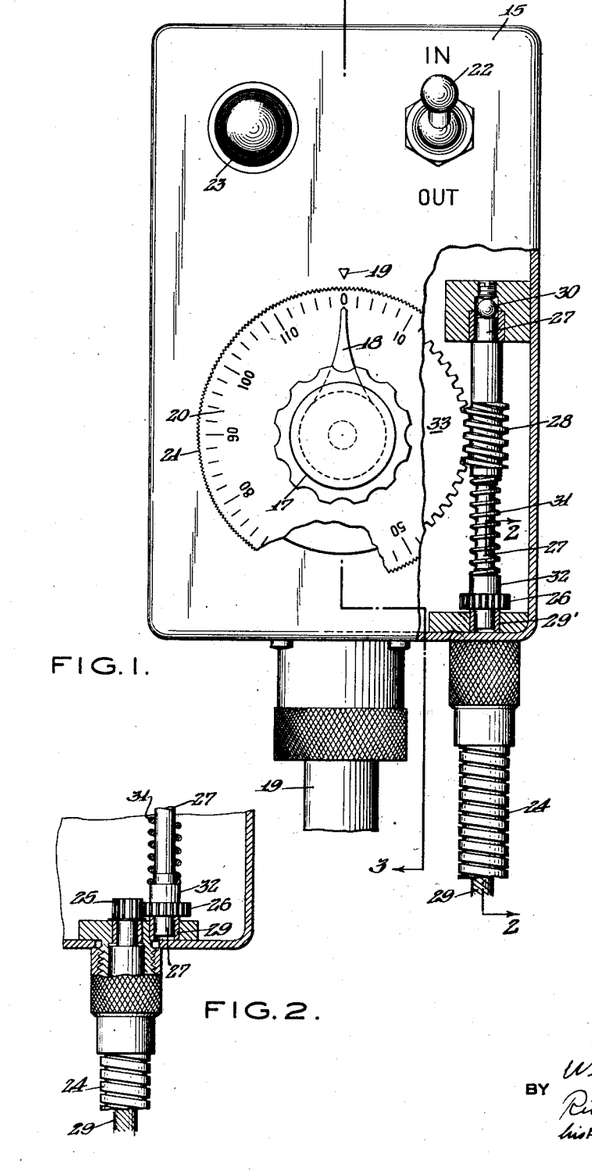
Fig. 1 is a plan view of the preselection control device of the invention, with some parts broken away.
Fig. 2 is a cross-sectional view of a detail of the control device taken along the line 2—2 of Fig. 1.
Figures 3, 4, 5:
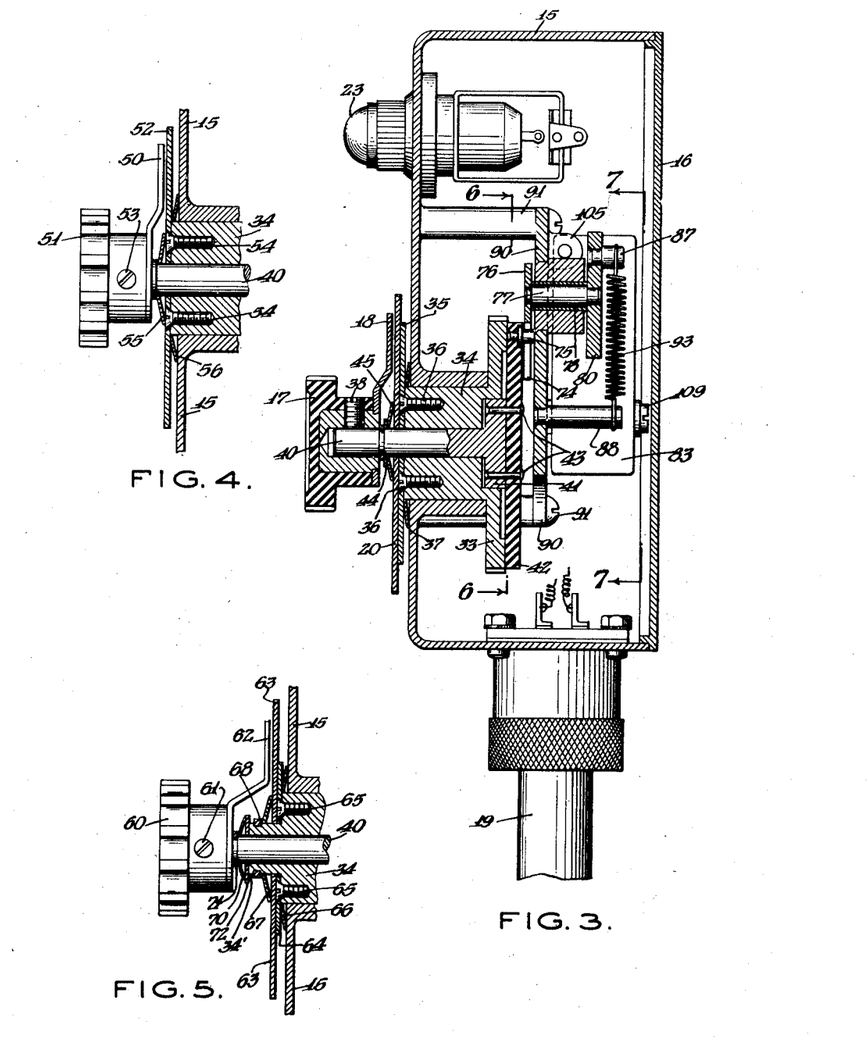
Fig. 3 is a vertical cross-sectional view through the control device, taken along the line 3—3 of Fig. 1.
Figs. 4 and 5 are cross-sectional views of modified arrangements for the control knob and dial of the control device.

Referring to the drawings, the remote control device or control head of the invention is shown in elevation in Fig. 1, and in cross-section in Fig. 3. The control head comprises a casing 15 fitted with a back plate 16, as seen in Fig. 3. The control head is preferably located near the pilot in the cockpit of the aircraft. A control knob 17 extends from casing 15. A pointer 18 is secured to knob 17, with a dial 20 arranged behind. Dial 20 is provided with markings corresponding to the amount of extended antenna wire as read opposite index 19. Dial 20 may be calibrated in feed extended or in radio frequency wave lengths corresponding to the lengths of extended antenna wire for most efficient transmissions on the wave lengths. The periphery 21 of dial 20 is knurled to facilitate its manual adjustment.

A manual control switch 22 is provided on casing 15 which may be moved to either the "in" or "out" positions indicated. The position of switch 22 determines the mode of operation of the reel, i. e. whether the antenna wire is to be fully retracted (in), or controllably extended (out). An indicating lamp 23 is arranged on casing 15, which lights up to apprise the pilot of unretracted antenna wire when the landing gear is lowered, so that he may have it retracted. Electrical cable 19 detachably connects the electrical section of control head 15 with the antenna reel circuit. A flexible shaft 29 extends from control head 15 and connects with the remote reeling motor. A protective sheath 24 surrounds shaft 29. Flexible shaft 29 drives pinion 25 which meshes with spur gear 26 that is slidably keyed to worm shaft 27. A worm 28 is integral with shaft 27, or keyed thereto. Worm shaft 27 is rotatably supported between bushing 29' and thrust end ball bearing 30. A compression spring 31 is concentric about shaft 27 and presses between hub 32 of slidably keyed gear 26 and the end of worm 28. Such arrangement permits worm 28 to have some end play, minimizing any freezing or breaking of its drive connection.

A worm gear 33 meshes with worm 28. A friction plate 35 is secured with gear 33 through hub 34 of gear 33 and countersunk screws 36. Friction plate 35 is juxtaposed with the dial 20. A spring washer 37 is interposed between housing 15 and friction plate 35, urging plate 35 against dial 20. A control shaft 40 extends through dial 20, friction plate 35, hub 34, and gear 33. Control knob 17 is secured to the outer end of shaft 40 by set screw 38. The other end of shaft 40 has an extended head portion 41. An insulation disk 42 is secured to head 41 by rivets 43. A retaining ring 44 is secured to shaft 40, against which spring washer 45 presses on dial 20.

Spring washers 37 and 45 thus press dial 20 and plate 35 into firm frictional engagement. Spring washer 45 also biases disk 42 into firm frictional engagement with worm gear 33 through shaft 40. Thus when control knob 17 is rotated, disk 42 is correspondingly directly turned. Despite the frictional coupling of disk 42 and worm gear 33, gear 33 remains stationary with dial 20 when disk 42 is turned, since gear 33 is in engagement with worm 28. Also, if dial 20 is manually rotated, it will move with respect to plate 35, which also remains stationary with gear 33. The zero adjustment of dial 20, corresponding to the fully retracted position of the antenna wire, is readily accomplished by manually turning dial 20 until its zero "0" marking is opposite index 19 when the antenna wire is fully retracted. The reading of dial 20 at index 19 indicates the amount of antenna wire actually extended from the aircraft; the reading of pointer 18 on dial 20 is the amount of antenna wire extended or to be extended. When the desired antenna length is extended, pointer 18 will have been turned to the position opposite index 19, the corresponding reading on the dial being the extended amount.

A modification of the described dial and pointer arrangement is shown in Fig. 4. Pointer 50 is secured to the control knob 51. The dial 52 is secured to gear hub 34 by countersunk screws 54. Knob 51 is secured to control shaft 40 by set screw 53. Spring washer 55 on control shaft 40 is equivalent to washer 45 of Fig. 3, serving to bias shaft 40 to the left to press disk 42 against gear 33. Spring washer 56 is arranged between dial 52 and housing 15 as washer 37 of Fig. 3. In this form friction plate 35 of Fig. 3 is omitted. Dial 52 is rigidly secured to hub 34, and hence its zero position is not directly adjustable.

A further modified construction is shown in Fig. 5, where any possibility that the dial be carried along with or displaced by the control knob is avoided. Here, control knob 60 is secured to shaft 40 by set screw 61. Pointer 62 is fixed to control knob 60. Dial 63 is in frictional engagement with gear hub 34 through the intermediary of friction plate 64 secured to hub 34 by countersunk screws 65. Spring washer 66 is interposed between housing 15 and friction plate 64. Spring washer 67 presses between retaining ring 68 secured to hub portion 34' and dial 63. Spring washers 66 and 67 act in the same manner as the corresponding washers 37 and 45 described in connection with the embodiment of Fig. 3. Another spring washer 70 is provided between retaining ring 71 on shaft 40 and a plate 72 arranged at the end of hub projection 34'. Accordingly, when control knob 60 is rotated, it will not tend to displace dial 63 because of washer 70 and spring washer 67 interposed between the dial 63 and the control knob 60.

Figure 6:
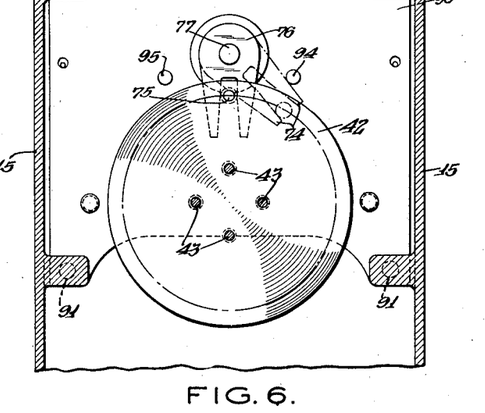
Figs. 6 and 7 are cross-seectional views through the control device, taken along the lines 6—6 and 7—7 respectively of Fig. 3.

Insulation disk 42 contains a pin 75 which is engageable with forked ends 74 of cam clevis 76, as shown particularly in Figs. 3 and 6. Clevis 76 is secured to clevis shaft 77, rotatably arranged in bearing 78. The other end of clevis shaft 77 carries switch cam 80, as shown particularly in Figs. 3 and 7. Switch cam 80 has a lower triangular shaped portion 81 and an upper circular cam portion 82. Switch cam 80 is arranged between switch units 83 and 84 in such manner as not to press or actuate switch plungers 85 and 86 when in the neutral or central position shown in Fig. 7. The type of switch known in the art as "micro-switch" is preferred for the switches 83 and 84, wherein the plungers 85 and 86 require only small pressure, and need be depressed only a small distance to effect the switching of comparatively large currents.

Figure 10:
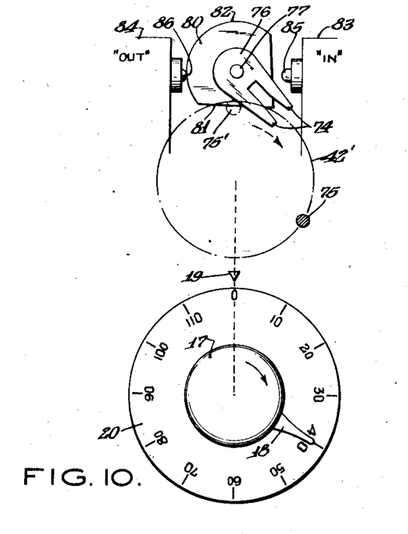
Figs. 10 to 13 are schematic showings of the operation of the control device of the invention.
Figure 11:
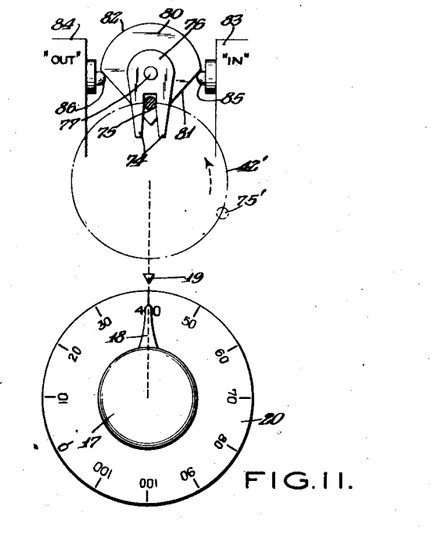
Figure 12:
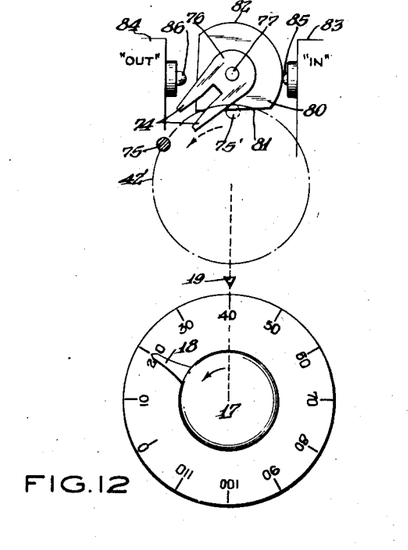
Figure 13:
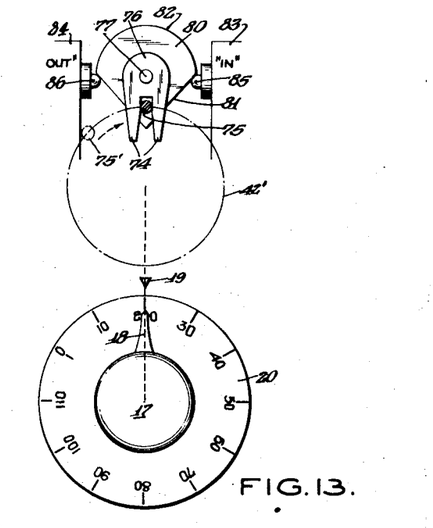

A pin 87 projects from cam 80 centrally, above clevis shaft 77. A spring post 88 is fastened to fixed plate 90 secured with housing 15 by screw studs 91. A spring 93 is stretched between pin 87 and spring post 88. Spring 93 produces a toggle action, keeping switch cam 80 in unstable equilibrium in the central neutral position, or displaced to the full right or left positions off center, as illustrated in Figs. 10 and 12, respectively. Spring 93 stabilizes the action of switch cam 80 against vibration or mechanical shock. Stops 94 and 95 limit the turning of cam clevis 76, as shown in Fig. 6.

Switch units 83 and 84 are provided with springs 97 and 98 respectively. One end of the springs is secured to plate 90. The other end of springs 97 and 98 are arranged in holes 101 and 102 provided in switches 83 and 84. The springs 97, 98 mechanically bias the switches towards cam 80. Adjustable stops 104, 105 limit the inward positions of switches 83, 84 and their corresponding plungers 85, 86. Stops 104, 105 are hexagonal headed screws threaded into bosses 106, 107 on plate 90. The setting of heads 104, 105 is adjusted by a suitable wrench, to predetermine the lateral position of plungers 85 and 86 with respect to the peripheral surface switch cam 80.

Figures 7, 8:
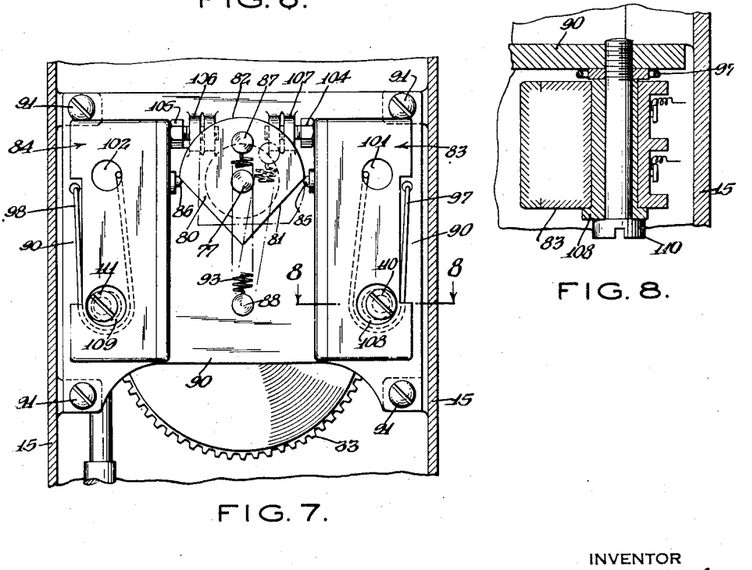
Fig. 8 is a cross-sectional view of a detail of the control device taken along the line 8—8 of Fig. 7.

The vertical adjustment of switches 83, 84 is performed by eccentric bushings 108, 109 secured respectively to stud screws 110, 111. Screws 110, 111 extend into plate 90. The screws 110, 111 and the bushings 108, 109 pass through openings in the switches 84, 85, as indicated in Fig. 8. By rotating adjusting stud screw 110 with bushing 108, switch unit 83 may be correspondingly raised or lowered, for adjusting the position of its plunger 85 vertically with respect to cam switch 80. Similarly, plunger 86 of switch unit 84 is adjusted by stud and bearing 109, 111.

Figure 9:
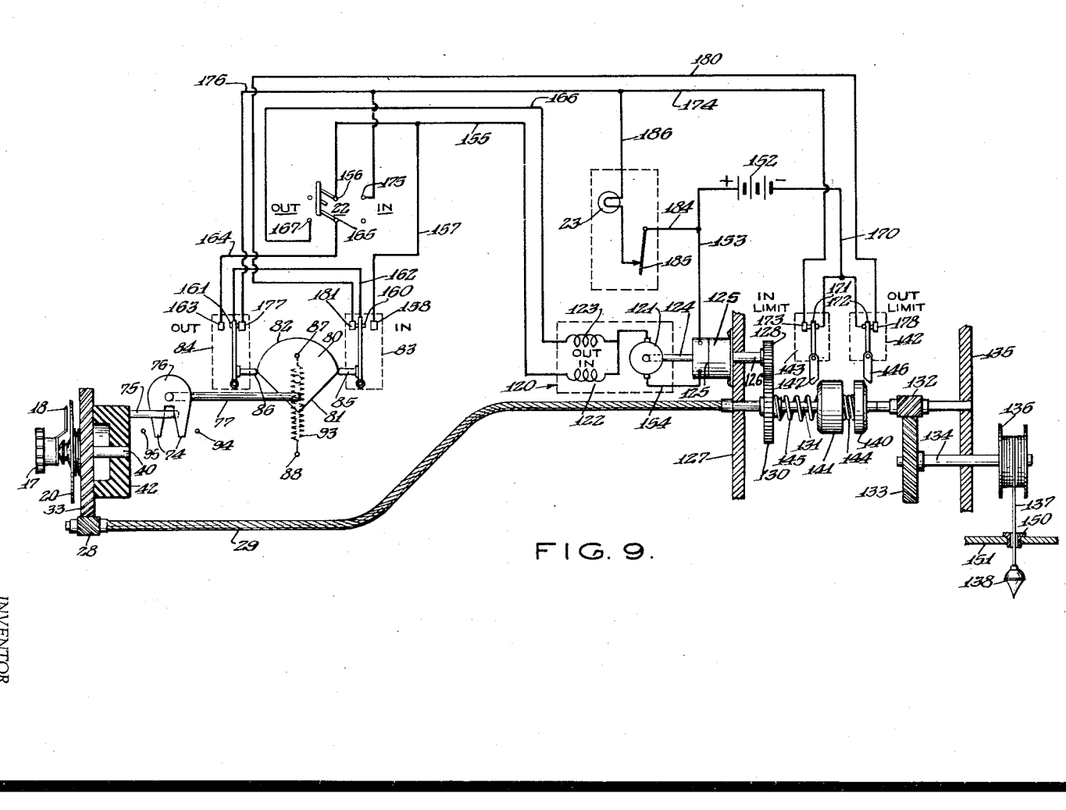
Fig. 9 is a diagrammatic electrical and mechanical representation of a preferred control system embodying the preselection control device of the invention for reeling an antenna wire.

Fig. 9 is a diagrammatic electrical and mechanical showing of the remote control device in circuit with an antenna reeling system. The left-hand side of Fig. 9 is a schematic representation of the control device described hereinbefore, corresponding numerals referring to identical components. The remote control device is preferably arranged within reach of the pilot. The antenna reeling mechanism on the right-hand side of Fig. 9 generally corresponds to that shown in U. S. Patent No. 2,204,579 of June 18, 1940, although other equivalent mechanisms may instead be used.

The antenna reeling mechanism and associated apparatus is located remote from the control device, preferably adjacent where the antenna wire projects from the fuselage of the airship. The mechanism comprises a reversible series motor 120 having an armature 121, an "in" field 122 and an "out" field 123 individually in series with armature 121. Motor shaft 124 is coupled to an electromagnetic clutch 125. Electromagnetic clutch 125 is preferably of an abruptly acting type, as for example, disclosed in Patent No. 2,267,114 of December 23, 1941, assigned to the same assignee as this application. Electromagnetic clutch 125 is connected in series with motor 120, and is energized and deenergized simultaneously therewith. Clutch 125 couples shaft 126 to motor armature shaft 124. Shaft 126 is journalled in frame plate 127. Shaft 126 drives pinion 128 which meshes with gear 130. Gear 130 is secured to shaft 131 journalled in frame plates 127 and 135.

As set forth in detail in Patent No. 2,204,579 referred to above, worm 132 is slidably keyed on shaft 131 and meshes with worm gear 133. Worm gear 133 is secured to shaft 134 journalled in frame plate 135. The antenna reel 136, on which antenna wire 137 is wound, is coupled to the external end of shaft 134. The free end of antenna wire 137 is weighted by weight 138. Worm gear 33 is operated in correspondence with reel 136 by a direct mechanical connection between shaft 131 and worm 28 through flexible cable 29. The gear ratio between worm 28 and worm gear 33 is designed so that dial 20 indicates the actual lengths of antenna wire 137 extended by reel 136, when read opposite index 19 shown in Fig. 1.

On shaft 131 are mounted an "out limit" cam 140 and an "in limit" cam 141 for operating "out limit" switch 142 and "in limit" switch 143 respectively. The manner of operation of cams 140 and 141 and switches 142, 143 is detailed in the Patent No. 2,204,579. "Out limit" cam 140 is secured to worm 132, both being longitudinally slidable on shaft 131. A light spring 144 is interposed between cams 140 and 141. A heavier compression spring 145 operates between gear 130 and "in limit" cam 141. Cam 141 is also slidably keyed to shaft 131. Cam 140 is arranged to actuate plunger 146 of "out limit" switch 142. Cam 141 is arranged to actuate plunger 147 of "in limit" switch 143.

Motor 120 is energized by a suitable source, such as battery 152 of the aircraft. The direction of rotation of motor 120 is determined by the connection of either "in" field 122 or "out" field 123 which is in circuit with battery 152. Lead 153 connects the positive pole of battery 152 with electromagnetic clutch 125, which in turn is connected through lead 154 to motor armature 121. "In" field 122 is connected to contact 156 of the double-pole-double-throw switch 22, which switch corresponds to that shown in Fig. 1, by lead 155, and to fixed contact 158 of "in" switch unit 83 by lead 157. Movable contact 160 of switch 83 is actuated by plunger 85, and is electrically connected to movable contact 161 of "out" switch unit 84 by connection lead 162. Movable contact 161 is actuated by plunger 86. Contact 163 of "out" switch 84 is connected through lead 164 with contact 165 of switch 22.

"Out" field 123 of the motor is connected through lead 166 with contact 167 of switch 22. The negative pole of battery 152 is connected by lead 170 to contacts 171 and 172 of switches 142 and 143. Contact 173 of "in limit" switch 143 is connected by lead 174 to contact 175 of control switch 22, and to contact 177 of "out" switch 84 by lead 176. Contact 178 of "out limit" switch 142 is connected to contact 181 of "in" switch 83 by lead 180. Switches 83 and 84 are shown in their neutral or inoperative position corresponding to the neutral or central position of switch cam 80. "In limit" switch 143 and "out limit" switch 142 are also shown in their neutral position.

The reel mechanism "out limit" and "in limit" switches 146, 147 are actuated as follows. When the antenna wire 137 is completely unwound, a reverse tension acts on wire 137 causing a displacement of worm 132 and cam 140 towards the right. Such displacement tilts plunger 146 of "out limit" switch 142, and opens the motor circuit to stop the wire extension. When antenna wire 137 is completely retracted by the rotation of motor 120, weight 138 abuts insulation bushing 150 in the fuselage 151, preventing further rotation of reel 136 and gear 133 by the motor. Gear 133 thereupon acts as a rack, moving worm 132 towards the left which correspondingly displaces cam 141 against plunger 147 of "in limit" switch 143 to open the motor circuit.

When it is desired to extend the antenna wire by a predetermined amount, knob 17 is turned until pointer 18 is opposite the marking on dial 20, indicating the desired length of the antenna to be extended. This causes a displacement of disk 42, turning clevis counter-clockwise through pin 75. Switch cam 80 accordingly is rotated counter-clockwise, to cause plunger 86 to be depressed from its normal position shown in Fig. 9, engaging movable contact 161 with contact 163. Switch 22 is of course connected to the left or "out" position, wherein contacts 167 and 165 are in connection. The motor is thereupon energized into "out" rotation.

The circuit is completed from the positive pole of battery 152 to clutch 125 through lead 153, to motor armature 121 through lead 154, to motor "out" field 123, by lead 166 to contact 167 of control switch 22, through switch contact 165, to closed contacts 163, 161 of switch 84 by lead 164, to normally closed contacts 160, 181 of switch 83 by lead 162, to "out limit" switch 142 by lead 188, and by lead 178 to the negative pole of battery 152. This circuit causes rotation of reeling motor 120 in the "out" direction, to unreel antenna wire 137. Simultaneously, flexible cable 29 rotates gear 33 and dial 20 in the direction to return pointer 18 to opposite index 19, as will be hereinafter described in more detail. Stopping of the "out" reeling by motor 120 is controlled by "out" switch 84. Switch 84 also is returned to its neutral position when switch cam 80 is returned thereto, releasing plunger 86 and causing the current to motor 120 and clutch 125 to be interrupted. The drive on reel 136 is stopped abruptly due to the action by electromagnetic clutch 125 to disconnect the motor shaft 124 therefrom, preventing any overshooting or hunting. The amount of wire extended is thus accurately controlled, particularly through the clutch 125 action and the locking action by gears 132, 133 and 128, 130.

When it is desired to reel-in the antenna wire to some other preset position, pointer 18 is manually moved over scale 20 in a counter-clockwise direction causing a clockwise rotation of cam clevis 76 and hence of switch cam 80. Plunger 85 of "in" switch 84 is thereupon depressed displacing contact 160 against contact 158. The "in" field 122 is thereupon energized with the reeling motor 120 in the "in" direction. The circuit is completed from the positive pole of battery 152 through the clutch 125, armature 121, "in" field 122, leads 155 and 157 to closed contacts 158, 160 of switch 83, to closed contacts 161, 177 of switch 84 by lead 162, to "in limit" switch 143 through leads 176 and 174 and to the negative pole of battery 152. As hereinafter described in detail, the reeling-in operation turns gear 33 in the direction to return disk 42 and pointer 18 to the central or neutral position, simultaneously bringing clevis 76 and cam 82 to the neutral position. At that time, plunger 85 is released and the reeling-in circuit to motor 120 and clutch 125 is opened at contacts 158, 160 of switch 83. Clutch 125 serves to abruptly stop the reel 137 at the proper position, gearing 128, 130 and 132, 133 assisting in the abrupt stopping action.

Should the pilot desire to fully retract antenna wire 137, he need simply flip control switch 22 to the "in" or antenna retracted position. A circuit is thereupon completed from the positive pole of battery 152 through clutch 125 by lead 153, to armature 121 and "in" field winding 122, to switch 22 contacts 156—175 by lead 166, lead 174, through "in limit" switch 143 to the negative pole of battery 152. This circuit connection by-passes both switch units 83 and 84 and directly connects the motor and clutch to reel-in. The reeling-in of the antenna is then controlled by the "in limit" switch 143, which is actuated in the manner referred to hereinabove when weight 138 abuts fuselage 151, to open the motor and clutch circuit.

Indicating lamp 23 previously referred to in connection with Fig. 1 is provided to apprise the pilot when the antenna is not in the fully retracted position when the plane's landing gear is extended. Lamp 23 is connected with the positive pole of battery 152 through lead 184 and switch 185. Switch 185 is normally open and is coupled to the landing gear of the aircraft, in such a manner as to be closed when the landing gear is fully extended. Lead 186 connects the other end of lamp 23 with lead 174 leading to "in limit" switch 143 back to the negative pole of battery 152 through lead 178. Indicating lamp 23 lights up when switch 185 is closed by the landing gear if "in limit" switch 143 is also closed to show that the antenna wire is not fully retracted at that time.

The general operation of the remote control head is diagrammatically indicated in Figs. 10 to 13. When it is desired to extend the antenna wire from the fully retracted position, to say 40 feet, control knob 17 is simply turned clockwise until pointer 18 is opposite numeral "40" on dial 20. As hereinabove described, due to the frictional coupling between insulation disk 42 and stationary gear 33, gear 33 and dial 20 remain stationary during the rotation of pointer 18. The clockwise rotation of control knob 17 to "40" carries disk 42 and its pin 75 from the neutral dotted line position 75' to the "40" foot position shown at 75 in Fig. 10. Pin 75 moves along a circular path indicated at 42', due to the rotary motion of disk 42. Pin 75 is disengaged from forked end 74 of clevis 76. Clevis 76 is turned counter-clockwise, as is switch cam 80, the cam 80 assuming the corresponding position shown. Clevis 76 and switch cam 80 are stably maintained in this position despite vibrations due to the aircraft by the toggle spring 93 and stops 94, 95. In the position of Fig. 10, circular cam portion 82 of cam 80 depresses or actuates plunger 86 of switch 84, leaving switch 83 unactuated. Switch 84 is the "out" switch, acting on the remote reeling circuit to reel out the antenna wire, as described hereinabove in connection with Fig. 9. Switch 83 is the reeling-in or "in" switch.

While control switch 22, shown in Figs. 1 and 9, remains in the "in" position, the antenna wire remains fully retracted. Accordingly, control knob 17 may be turned or preset to any desired reeling out position, prior to take-off of the aircraft. When the pilot wishes to unreel the antenna by the preset length, he simply flips control switch 22 to the "out" position. This energizes reeling motor 120 so as to rotate in a direction extending the antenna wire, as set forth above. Extension of the antenna wire causes a counter-clockwise rotation of worm gear 33 and with it, control knob 17, pointer 18 and dial 20 by virtue of the frictional coupling between disk 42 and gear 33. The reeling motor continues to rotate, extending the antenna wire, until pointer 18 and dial 20 are in the central or neutral position of Fig. 11. Pin 75 on disk 42 returns from the preset "40" position 75' along path 42' to central position shown at 75. During its return travel, the forked end 74 of clevis 76 is engaged by pin 75 and restored to its neutral position. Switch cam 80 is correspondingly reset to its neutral position, disengaging plunger 86 of out-switch 84. The disengagement of switch 84 opens the reeling-out circuit of motor 120, stopping the unreeling. The wire is unreeled by the preset or desired amount, as indicated on dial 20 by both index 19 and pointer 18.

With the invention system it is feasible to directly change the amount of extended wire to a new value, more or less than the amount extended, by simply turning pointer 18 opposite the new required figure on dial 20. Thus, Fig. 12 is the position of Fig. 11 moved from extended "40 feet" to new extended "20 feet." The counter-clockwise rotation of pointer 18 causes a corresponding rotation of disk 42. Pin 75 is thereupon moved from the dotted line neutral position 75' to the full line position 75. The disengagement of pin 75 from forked end 74 of clevis 76 causes it to turn clockwise on shaft 77. Cam 80 is rotated clockwise so that circular cam portion 82 actuates plunger 85 of "in" switch 83. As shown in Fig. 9, with switch 22 in the "out" position, actuation of plunger 85 starts up motor 120 to reel-in the antenna wire. The reeling-in of the antenna wire causes a clockwise rotation of worm gear 33 and dial 20, carrying in unison therewith control knob 17 and pointer 18. Pin 75 simultaneously rotates in a clockwise direction from the dotted line position 75' of Fig. 13 to the full line or neutral position 75. The reeling motor remains energized until circular cam portion 82 of switch cam 80 becomes neutral and releases plunger 85 of "in" switch 83. This stops the motor with the preset amount of antenna wire extended from the aircraft. To fully retract the antenna wire, main switch 22 is turned to the "in" position of Figs. 1 and 9, which bypasses the preselection circuit of the control head and connects the motor 120 to reel-in the wire until stopped by in-limit switch 143.

While the present invention has, for purposes of illustration, been described as incorporated in a system for controlling a reelable antenna, it will be understood that the invention may be otherwise embodied in suitable control systems for preselecting a desired operated position of a movable member. Thus, the control device of the present invention may be used in a system for remotely controlling the position of wing flaps, rudders, landing gears, and other accessories of an aircraft. It will be understood that a specific embodiment of the invention has been described only to illustrate the application of the principles thereof, and that the invention may be otherwise embodied, without departing from such principles.

What I claim and desire to secure by United States Letters Patent is:

1. A remote control system comprising: a device operable between extended and retracted positions; reversible motive means coupled to said device; mechanism for selectively controlling the degree of extension and retraction of said device including a movable member, means remotely coupling said member with said device for displacing said member in accordance with the motivation of said device, an element mechanically coupled with said member and normally displaceable therewith, said element being displaceable in either direction with respect to said member for correspondingly predetermining the degree of extension or retraction of said device; and reversible switching apparatus actuated by said element upon its relative displacement in either direction for energizing said motive means to operate said device in the direction corresponding to the direction of the displacement of said element.

2. A remote control system comprising: a device operable between extended and retracted positions; a reversible motor coupled to said device; mechanism for selectively controlling the degree of extension and retraction of said device including a rotatable member, means remotely coupling said member with said device for rotating said member through an arc in accordance with the motivation of said device, an element coupled with said member and normally rotatable therewith, said element being displaceable from its neutral position and in either direction with respect to said member for correspondingly predetermining the degree of extension or retraction of said device; and reversible switching apparatus actuated by said element upon its relative displacement in either direction for energizing said motor to operate said device in the direction corresponding to the direction of the displacement of said element.

3. A remote control system comprising: a device operable between extended and retracted positions; reversible motive means coupled to said device; mechanism for selectively controlling the degree of extension and retraction of said device including a movable member, means remotely coupling said member with said device for displacing said member in accordance with the motivation of said device, an element frictionally coupled with said member and normally displaceable therewith, said element being manually displaceable from its neutral position and in either direction with respect to said member for correspondingly predetermining the degree of extension or retraction of said device; and reversible apparatus actuated by said element upon its relative displacement in either direction for energizing said motive means to operate said device in the direction corresponding to that of the element displacement, said apparatus including circuit connections and switch means operated by said element to deenergize said motive means when said element is returned to its neutral position by said member.

4. A remote control system comprising: a device operable between extended and retracted positions; reversible electric motive means coupled to said device; mechanism for selectively controlling the degree of extension and retraction of said device including a gear, means remotely connecting said gear with said device for rotating said gear through an arc in correspondence with the motivation of said device, a disk coupled with said gear and normally rotatable therewith, said disk being displaceable from its neutral position and in either direction with respect to said gear for correspondingly predetermining the degree of extension or retraction of said device; and reversible apparatus including circuit connections actuated by said disk upon its displacement in either direction for energizing said motive means to operate said device in the direction corresponding to that of the displacement, said apparatus including switch means operated by said disk to deenergize said motive means when said disk is returned to its neutral position by said gear.

5. A remote control system comprising: a device operable between extended and retracted positions; reversible motive means coupled to said device; mechanism for selectively controlling the degree of extension and retraction of said device including a gear, a dial connected with said gear, means remotely coupling said gear with said device for rotating said gear in correspondence with the motivation of said device, a member frictionally coupled with said gear and normally rotatable therewith, a control knob secured to said member, a pointer extending from said knob and arranged opposite indications on said dial, said member being rotatably displaceable through said knob in either direction with respect to said gear for predetermining the degree of extension or retraction of said device as indicated by said pointer on said dial; and reversible switching means actuated by said member upon its relative displacement in either direction for energizing said motive means to operate said device in the direction corresponding to that of said member displacement, said reversible switching means including apparatus controlled by said member for deenergizing said motive means when said member is returned to its neutral position by said gear.

6. A remote control system comprising: a device operable between extended and retracted positions; a reversible electric motor coupled to said device; mechanism for selectively controlling the degree of extension and retraction of said device including a gear, a dial connected with said gear, means coupling said gear with said device for rotating said gear in accordance with the motivation of said device, a member frictionally coupled with said gear and normally rotatable therewith, a control knob secured to said member, a pointer extending from said knob and arranged opposite indications on said dial, said member being relatively rotatable through said knob from its neutral position and with respect to said gear for correspondingly predetermining the degree of extension or retraction of said device; and reversible apparatus actuated by said member upon its relative rotation for energizing said motor to operate said device in the direction corresponding to that of said relative rotation, said apparatus including an element carried by said member, a clevis engageable with said element, a cam connected with said clevis, and switches in circuit with said motor and arranged for selective actuation by said cam.

7. A remote control system comprising: a device operable between extended and retracted positions; a reversible electric motor coupled to said device; mechanism for selectively controlling the degree of extension and retraction of said device including a gear, means coupling said gear with said device for rotating said gear in accordance with the motivation of said device, a disk frictionally coupled with said gear and normally rotatable therewith, said disk being angularly displaceable from its neutral position and in either direction with respect to said gear for correspondingly predetermining the degree of extension or retraction of said device; and reversible apparatus actuated by said disk upon its angular displacement for energizing said motor to operate said device in the direction corresponding to that of said angular displacement, said apparatus including an element carried by said disk, a clevis engageable with said element, a cam secured to and rotatable with said clevis, two switches in circuit with said motor and arranged for selective actuation by said cam; said cam being restored to its neutral position with respect to said switches when said disk is returned to its neutral position by said gear, whereby said switches are unactuated and said motor is deenergized.

8. Mechanism for remotely controlling a device in either direction comprising a member movable in accordance with the operation of said device, an element coupled with said member and normally movable therewith, reversible switching means, and apparatus controlled by said element for selectively actuating said switching means, said apparatus being returned to its neutral position by the movement of said member to disengage said switching means.

9. Mechanism for remotely controlling a device in either direction comprising a member displaceable in accordance with the operation of said device, an element coupled with said member and relatively displaceable in either direction with respect thereto, a pair of switches, and a cam controlled by said element for selectively actuating said switches in accordance with the relative displacement of said element, said cam being returned to its neutral position by the displacement of said member to disengage said switches.

10. Mechanism for remotely controlling a device in either direction comprising a gear rotatable in accordance with the operation of said device, an element frictionally coupled with said gear and relatively displaceable in either direction with respect thereto, reversible switching means, and an instrumentality controlled by said element for selectively actuating said switching means in accordance with the relative displacement of said element, said instrumentality being returned to its neutral position by the rotation of said gear to disengage said switching means.

11. Mechanism for remotely controlling a device comprising a gear rotatable in accordance with the operation of said device, a disk frictionally coupled with said gear and relatively displaceable in either direction with respect thereto, a pair of electrical switches, and apparatus controlled by said disk for selectively actuating said switches in accordance with the relative displacement of said disk, said apparatus including a cam coacting with said switches, and a clevis connected between said cam and said disk.

12. Mechanism for remotely controlling a device comprising a gear rotatable in accordance with the operation of said device, an element coupled with said gear and relatively displaceable in either direction with respect thereto, a pair of switches, and an instrumentality controlled by said element for selectively actuating said switches in accordance with the relative displacement of said element, said instrumentality including a cam coacting with said switches, a spring normally holding said cam in its neutral position with respect to said switches, a clevis connected with said cam, and stops limiting the movement of said clevis for selective engagement with a projection of said element, said cam being returned to its neutral position by the rotation of said gear to disengage said switch means.

13. Mechanism for remotely controlling a device comprising a gear rotatable in accordance with the operation of said device, a disk frictionally coupled with said gear and normally rotatable therewith, a control knob secured to said disk for displacing said disk with respect to said gear, a dial attached to said gear and a pointer extending from said knob to indications on said dial to indicate a relative displacement between said disk and said gear, switch means, and apparatus controlled by said disk for selectively actuating said switch means in accordance with the relative displacement of said disk and said gear, said apparatus including a cam coacting with said switch means, and a clevis connected between said cam and said disk, said cam being returned to its neutral position by the rotation of said gear to disengage said switch means.

14. An antenna reeling system comprising a reel containing an antenna wire, a reversible electric motor, an abruptly actuable electromagnetic clutch coupling said motor to said reel, and means including circuit connections to said motor and clutch for controllably extending and retracting said antenna wire, said means including a switch for deenergizing said motor and clutch when a desired position of said antenna wire is attained whereby said clutch is abruptly disengaged and said reel is arrested at the desired position.

15. An antenna reeling system comprising a reel containing an antenna wire, a reversible electric motor, a worm and worm gear connection between said reel and said motor, an electromagnetic clutch coupling said motor to said connection, and means including circuit connections to said motor and clutch for controllably extending and retracting said antenna wire, said means including a switch for deenergizing said motor and clutch when a desired position of said antenna wire is attained whereby said clutch is abruptly disengaged and said reel is arrested at the desired position.

16. A remote control system comprising: a device operable between extended and retracted positions; a reversible electric motor coupled to said device; mechanism for selectively controlling the degree of extension and retraction of said device, said mechanism including a movable member, circuit connections, a first switch for energizing said motor to extend said device and a second switch for energizing said motor to retract said device; means remotely coupling said member with said device for displacing said member in accordance with motivation of said device; an element mechanically coupled with said member and normally displaceable therewith, said element being displaceable in either direction with respect to said member for predetermining the degree of extension and retraction of said device and selectively actuating said switches to energize said motor for operation of said device in the direction corresponding to the direction of displacement of said element, said element being restored to a neutral position by displacement of said member in accordance with motivation of said device, to condition the selectively actuated switch to deenergize said motor; and limit switch means operable by said device at either limit of its movement for effecting deenergization of said motor independently of said mechanism.

17. A remote control system comprising: a device operable between extended and retracted positions; a reversible electric motor coupled to said device; mechanism for selectively controlling the degree of extension and retraction of said device, said mechanism including a movable member, circuit connections, a first switch for energizing said motor to extend said device and a second switch for energizing said motor to retract said device; means remotely coupling said member with said device for displacing said member in accordance with motivation of said device; an element mechanically coupled with said member and normally displaceable therewith, said element being displaceable in either direction with respect to said member for predetermining the degree of extension and retraction of said device and selectively actuating said switches to energize said motor for operation of said device in the direction corresponding to the direction of displacement of said element, said element being restored to a neutral position by displacement of said member in accordance with motivation of said device, to condition the selectively actuated switch to deenergize said motor; and a master switch in circuit connection with said first and second switch and movable to a first position for rendering said first switch ineffective to energize said motor, and a second position for shunting said second switch to energize said motor to retract said device independently of said mechanism.

18. A remote control system comprising: a device operable between extended and retracted positions; a reversible electric motor coupled to said device; mechanism for selectively controlling the degree of extension and retraction of said device, said mechanism including a movable member, circuit connections, a first switch for energizing said motor to extend said device and a second switch for energizing said motor to retract said device; means remotely coupling said member with said device for displacing said member in accordance with motivation of said device; an element mechanically coupled with said member and normally displaceable therewith, said element being displaceable in either direction with respect to said member for predetermining the degree of extension and retraction of said device and selectively actuating said switches to energize said motor for operation of said device in the direction corresponding to the direction of displacement of said element, said element being restored to a neutral position by displacement of said member in accordance with motivation of said device, to condition the selectively actuated switch to deenergize said motor; a master switch in circuit connection with said first and second switch and movable to a first position for rendering said first switch ineffective to energize said motor, and a second position for shunting said second switch to energize said motor to retract said device independently of said mechanism; and limit switch means operable by said device at either limit of its movement for effecting deenergization of said motor independently of said mechanism.

WILLIAM P. LEAR.